Sept. 15, 1970

C. R. BANKS 3,529,085

POD AUDIO SYSTEM

Filed Jan. 19, 1968

INVENTOR
CHARLES R. BANKS

BY *James H. Littlepage*

ATTORNEY

Sept. 15, 1970 C. R. BANKS 3,529,085
POD AUDIO SYSTEM
Filed Jan. 19, 1968 3 Sheets-Sheet 2

Sept. 15, 1970     C. R. BANKS     3,529,085
POD AUDIO SYSTEM

Filed Jan. 19, 1968     3 Sheets-Sheet 3

INVENTOR
CHARLES R. BANKS

BY *James H. Littlepage*
ATTORNEY

United States Patent Office 3,529,085
Patented Sept. 15, 1970

3,529,085
POD AUDIO SYSTEM
Charles R. Banks, 2350 Duke St., Alexandria, Va. 22314
Filed Jan. 19, 1968, Ser. No. 699,119
Int. Cl. H04r 1/30
U.S. Cl. 179—1
4 Claims

ABSTRACT OF THE DISCLOSURE

A bank of loudspeaker cones is mounted amidships of a streamline pod shell, with the sound-projecting speaker projecting laterally and downwardly from one side of the pod. An audio amplifier is mounted in the pod shell rearwardly of the speaker bank. The pod shell is adapted for mounting in a bomb rack on an aircraft wing so that sound may be continuously directed to a given location on the ground by circling the aircraft around such location.

RELATED APPLICATION

A design application of Charles R. Banks for Pod Mounted Speaker System filed concurrently herewith.

PRIOR ART

None known.

OBJECTS

Heretofore it has been the practice to mount sound systems in aircraft so that an audio message may be broadcast to inhabitants below. Typical uses are for communicating with people in disaster areas, on ships in distress, or in jungles or other remote locations. When the audio system is mounted in the aircraft fuselage, several problems are encountered. Either a side door must be left open, or an opening cut in the fuselage, or the speaker must be mounted below the fuselage, all of which are undesirable. If the sound-projecting axes of the speakers point directly downwardly, even with a slow-flying aircraft there is not enough time over the target area to broadcast a lengthy message, and also the aircraft must fly directly over the target area, which makes the aircraft itself a good target. Furthermore, a fuselage-mounted audio system is difficult to jettison in event the need arises. The object now is to overcome the above objections by mounting an audio system in a bomb pod in such manner that the loudspeaker axes are directed downwardly and outwardly from one side thereof so that the aviator needs only to bank the aircraft slightly and circle the target area to broadcast a lengthy message to a given target area; and if the aircraft is attacked, he can jettison the entire audio system and fly off.

These and other objects will be apparent from the following specification and drawings, in which.

Figure 3:
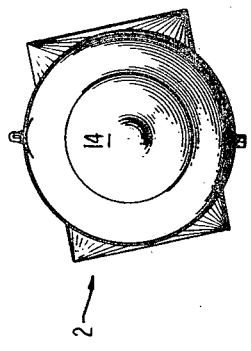
Figure 4:
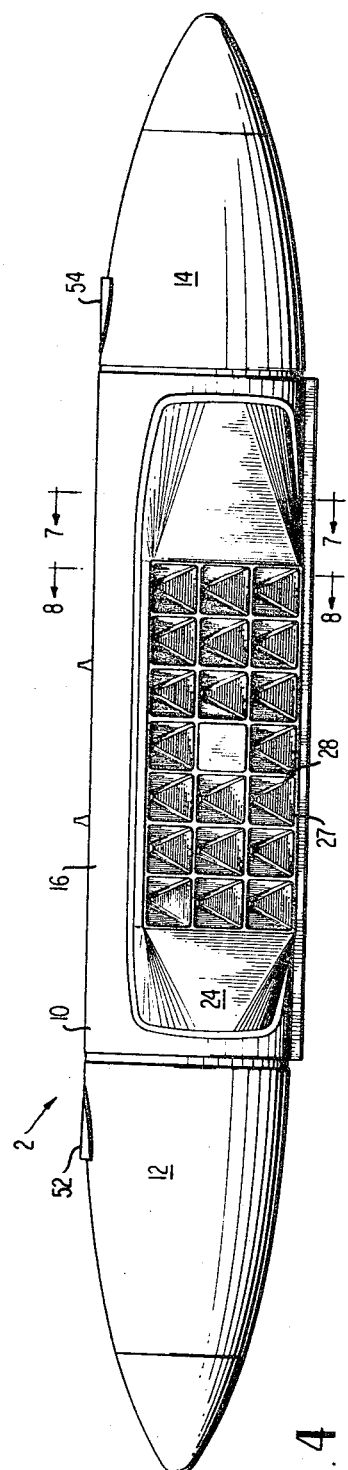
Figure 5:
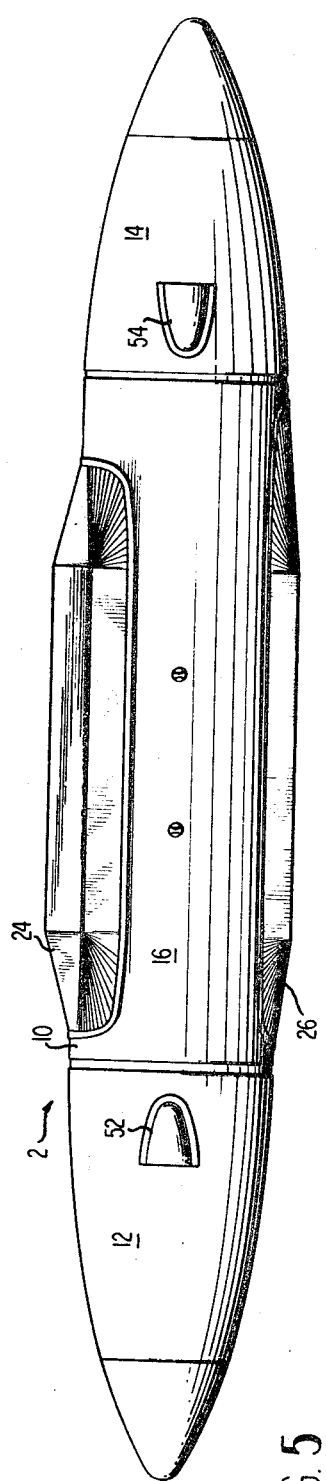
Figure 6:
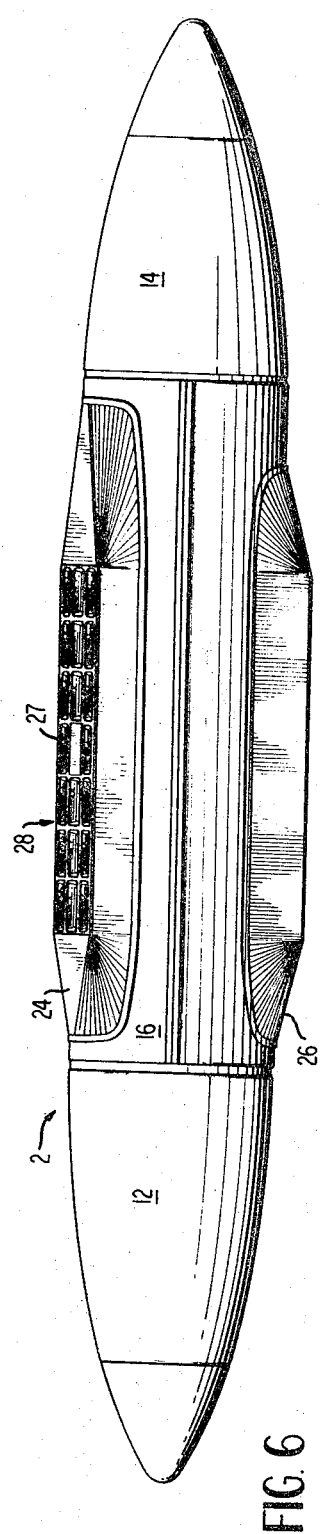
Figure 9:
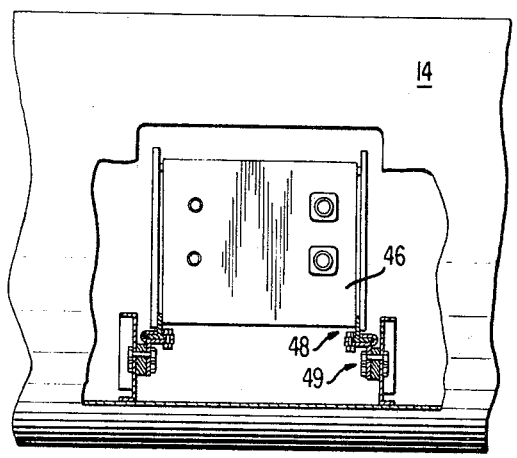
Figure 7:
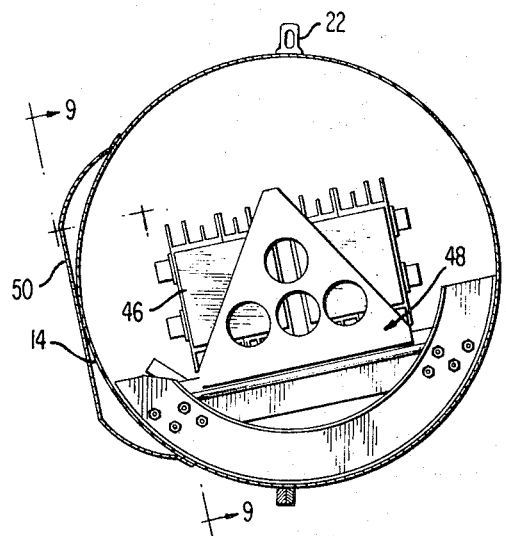
Figure 8:
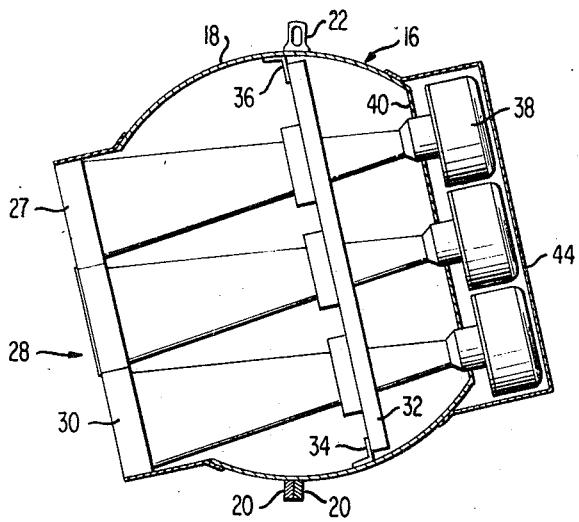
Figure 10:
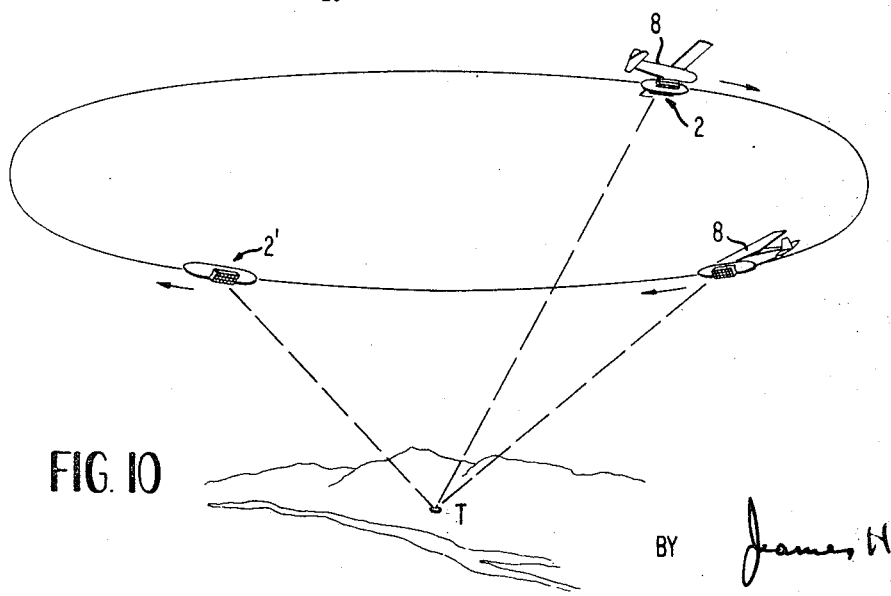

FIG. 3 is a rear end view of the device;
FIG. 4 is an outboard side elevation;
FIG. 5 is a top view;
FIG. 6 is a bottom view;
FIG. 7 is a cross section along the lines 7—7 of FIG. 4, with framing removed;
FIG. 8 is a cross section along the lines 8—8 of FIG. 4;
FIG. 9 is a fragmentary outboard side elevation of part of the rear cone, broken away along the lines 9—9 of FIG. 7 to show the audio amplifier and mounting therefor; and FIG. 10 is a diagram illustrating typical operation of the device.

Figure 1:
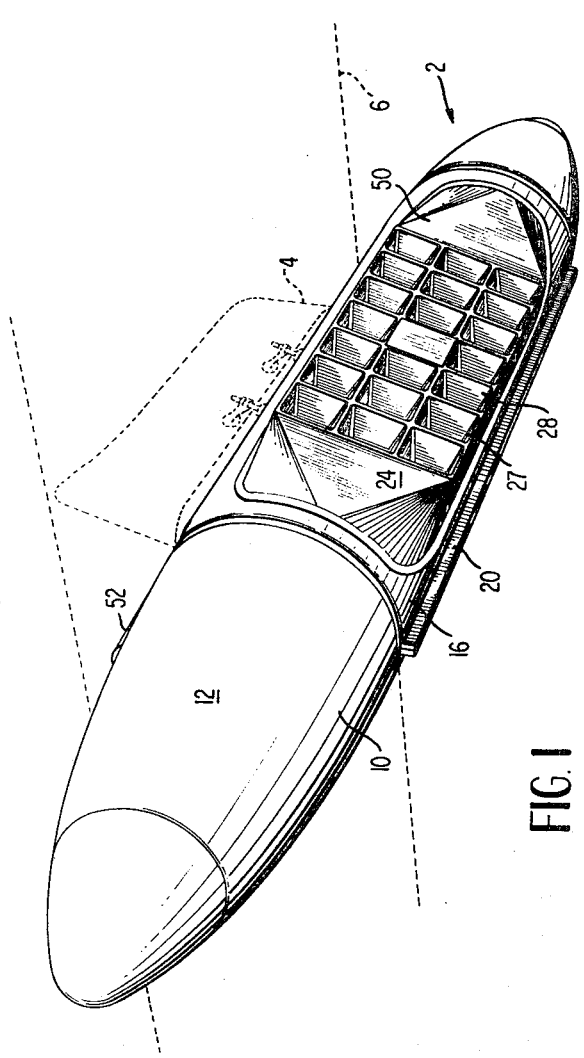
FIG. 1 is a perspective view of the device from the outboard side, fragmentarily showing in dash lines a typical aircraft wing mounting.
Figure 2:
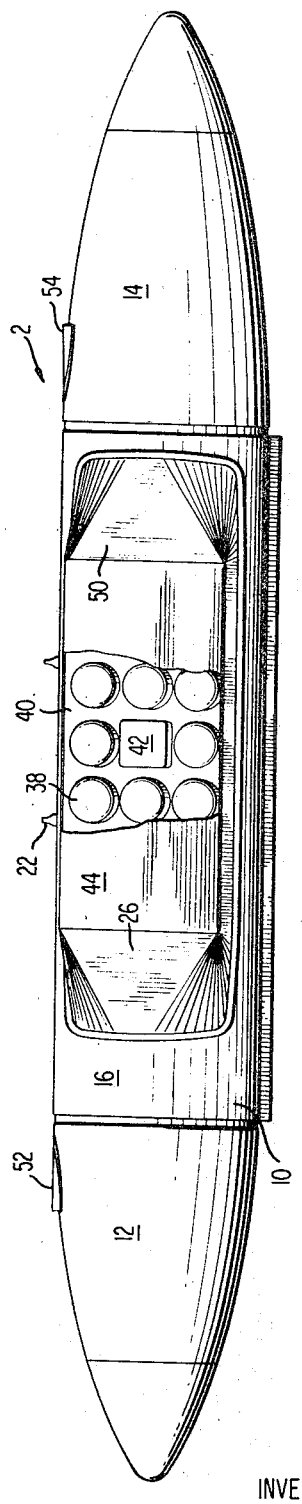
FIG. 2 is an inboard side view of the device partly broken away.

Referring now to the drawings, in which like reference numerals denote similar elements, the pod audio system 2 is shown (FIGS. 1 and 10) in typical environment of use, i.e., mounted by a bomb rack 4 beneath the wing 6 of an aircraft 8. The system includes a streamline shell 10 of the general size and shape of a typical napalm bomb which consists of a hollow nose cone 12, a hollow tail cone 14 and a central section 16. Central section 16 is formed of hollow shell plates 18 joined along the bottom by keel flanges 20 secured together, and provided at the top with bomb rack eyes 22. Details of some of the interior framing have been omitted. Outboard and inboard side fairing plates 24 and 26 are provided on central section 16 for maintaining streamline contours.

On the outboard side of central section 16 are the mouths 27 of a bank of loudspeakers 28 whose cones 30 are secured in an apertured mounting plate 32 which is mounted by angle irons 36, 38 (FIG. 8) in shell plates 18. The loud speaker drivers 38 are also secured by an apertured plate 40 to shell plates 18, as also is a junction box 42. A removable inboard side cover plate 44 overlies the drivers 38 and junction box 42 so that they may be wired to the audio amplifier 46 described below.

Audio amplifier 46 is a high power, light weight, transistorized unit whose chassis 48 is mounted on a drawer trackway 49 in section 14, a movable cover plate 50 being provided so that the amplifier may be pulled out for maintenance. Forwardly and rearwardly directed air scoops 52, 54 in nose and tail cones 12 and 14 circulate cooling air past the drivers 38 and amplifier 46.

It will be understood that the auxiliary equipment, such as a microphone or tape player, and power supply are mounted in the aircraft.

FIG. 10 diagrammatically illusrtates typical operation of the device, Assuming a message is to be broadcast to a target area T, because of the downward and outward angle of the loudspeaker sound projecting axes, aircraft 8 may be normally banked so as to circle around the target area. If the device be mounted on a helicopter, only limited banking would be necessary in order to focus the sound on the target area. If the necessity arises, the system may be jettisoned as indicated at 2'.

The invention is not limited to the details shown and described herein, but is intended to cover all substitutions, modifications and equivalents within the scope of the following claims.

I claim:
1. A pod audio system adapted to be mounted on an aircraft, comprising
   a generally aerial torpedo shape body having top, bottom, inboard and outboard sides and comprised of
      a hollow nose cone section,
      a hollow tail cone section,
   and a central section disposed between the nose cone and tail cone sections,
      said central section having mounted therein a bank of loudspeakers with mouths on the outboard side thereof,
   and audio amplifier means mounted in one of said sections.
2. The combination claimed in claim 1, said loudspeakers having sound-projecting axes directed down- wardly and outwardly from the outboard side of said central section.

3. The combination claimed in claim 1, and means on the top side of said body for mounting the same on a bomb rack of an aircraft.

4. The combination claimed in claim 1, said sections being generally hollow save for the loudspeaker bank and amplifier, and forwardly and rearwardly directed air scoops on said nose and tail cone sections, respectively, for circulating air past said loudspeaker bank and said amplifier.

References Cited

UNITED STATES PATENTS 1,581,586   4/1926   McCauley _____ 179—1

FOREIGN PATENTS 944,843   3/1947   France.

KATHLEEN H. CLAFFY, Primary Examiner

D. W. OLMS, Assistant Examiner